United States Patent

Oshida et al.

[11] Patent Number: 4,473,750
[45] Date of Patent: Sep. 25, 1984

[54] THREE-DIMENSIONAL SHAPE MEASURING DEVICE

[75] Inventors: Yoshitada Oshida, Fujisawa; Yoichi Kawata, Hitachi; Shinobu Watanabe, Hitachi; Noboru Umehara, Hitachi; Kenichi Isoda, Yokohama, all of Japan

[73] Assignee: Hitachi, Ltd., Tokyo, Japan

[21] Appl. No.: 238,512

[22] Filed: Jul. 24, 1981

[30] Foreign Application Priority Data

Jul. 25, 1980 [JP] Japan .................................. 55-101281
Jul. 25, 1980 [JP] Japan .................................. 55-101282

[51] Int. Cl.³ ............................................ G01N 21/86
[52] U.S. Cl. ...................................... 250/560; 356/376
[58] Field of Search ...................... 250/560, 561, 202; 356/1, 4, 375, 376, 381

[56] References Cited

U.S. PATENT DOCUMENTS 3,355,590 11/1967 Bertram .............................. 250/202
4,136,949 1/1979 Hayamizu et al. .................. 250/560
4,325,640 4/1982 Dreyfus et al. ........................ 356/1
4,375,921 3/1983 Morander ............................ 250/560

Primary Examiner—David C. Nelms
Attorney, Agent, or Firm—Antonelli, Terry & Wands

[57] ABSTRACT

A three-dimensional shape measuring device comprises a light beam condensing and irradiating system for irradiating a light beam to an object at a fixed angle $\theta$ and converging the light beam to a desired minimum diameter at a point A on an optical axis of the light beam, an imaging optical system having an optical axis having an angle $\phi$ different from the angle $\theta$ and including the point A on the optical axis thereof, for focusing the point A on an effectively constant aperture of a detecting light screen or on a small area, aperture-transmitted light detecting means or photo-electric converter means for detecting light transmitted through the aperture or the small area, detecting position changing means for changing a relative position between the object and the point A, maximum value detecting means for detecting a maximum value of the signal detected by the aperture-transmitted light detecting means or the photo-electric converter means and detection means for detecting a change in the detecting position caused by the detecting position changing means at a time when the maximum value detecting means detects the maximum value. The change in the detecting position is sequentially detected by the detecting means for each of a plurality of points on the surface of the object to measure the three-dimensional shape of the object.

17 Claims, 12 Drawing Figures

THREE-DIMENSIONAL SHAPE MEASURING DEVICE

BACKGROUND OF THE INVENTION

The present invention relates to a three-dimensional shape measuring device for measuring a three-dimensional shape of an object by an optical non-contact method.

In a known method for measuring a shape of a three-dimensional object, a surface of the object is traced by a tracer disk and a contour of the tracer disk is plotted by a pen to determine the shape of the object by an envelope of the plotted pattern. This method has disadvantages in that it is a contact method, measuring accuracy is poor because the shape is determined by the envelope and a long measuring time is required. In one prior art optical non-contact method, a laser beam is irradiated on an object and imaged on a position detector from a direction different from the direction of irradiation to determine a three-dimensional shape by a signal level from the position detector. In another prior art method, a relative distance between an entire measuring system and an object is varied so that an image is focused at a center of a position detector. Such optical methods, however, are highly affected by a reflection characteristic of the object so that accurate measurement from a position signal of a reflected light is not attained. More particularly, a light intensity received by the position detector varies in two orders depending on the reflection characteristic of the surface of the object and relative relations between a normal direction of the surface and the direction of laser beam irradiation, and the direction of imaging. Because of such variation in the light intensity, it has been difficult to accurately determine the position.

SUMMARY OF THE INVENTION

It is an object of the present invention to provide a three-dimensional shape measuring device which uses a non-contact method and is relatively unaffected by the reflection characteristic of the object and capable of measuring the three-dimensional shape with a high accuracy.

According to a feature of the present invention, light is irradiated on an object with a constant angle $\theta$ by a light beam condensing and irradiating system which causes the light beam to converge in a desired minimum diameter at a point A on an optical axis of the irradiated light, and an imaging optical system having an optical axis of an angle $\phi$ which is different from the angle $\theta$ which includes the point A on the optical axis thereof is provided to focus the point A to a small area, and the optical image of the small area is detected by a light detector. In addition, relative position between the object and the point A is changed to detect a maximum level of the signal from the light detector so that the relative position which results in the maximum detection signal level is determined. Since the instant at which the maximum signal level is detected corresponds to a time point at which the point A is on a surface of the object, a spatial position of the object surface can be determined by the relative position. By conducting such measurement to a plurality of different points of the object, the three-dimensional shape of the object can be measured with less affect by the reflection characteristic of the object.

It should be understood that the light detector may have a photosensitive plane for receiving the light from the small area or may comprise a detecting light screen having a fixed aperture and a photosensitive element arranged behind the light screen.

The present invention is characterized by that the irradiating optical system for irradiating the laser beam on the object at the constant angle $\theta$ and the imaging optical system having the optical axis of the angle $\phi$ are arranged such that the optical axes of those systems interset at the point A near the object and the point A is imaged at a fixed point B on the position detection plane by the imaging optical system. Movable mirrors are disposed in the irradiating optical system and the imaging optical system.

By moving the movable mirrors such that the imaging point of the point A by the imaging optical system is always positioned at the point B as the movable mirror is moved, the point A can be brought to conform to the surface of the object having uneven surface with the mirrors being moved in a range which is less than one half or a quarter of the depth of the unevenness on the surface of the object, as will be discussed in detail below. Accordingly, the three-dimensional shape can be measured with a small movable part in a short time.

By mounting the movable mirrors in the irradiating optical system and the imaging optical system on a common drive table, the point A can be more readily and accurately imaged at the point B so that more accurate measurement of the three-dimensional shape is attained.

DESCRIPTION OF THE PREFERRED EMBODIMENTS

Figure 1:
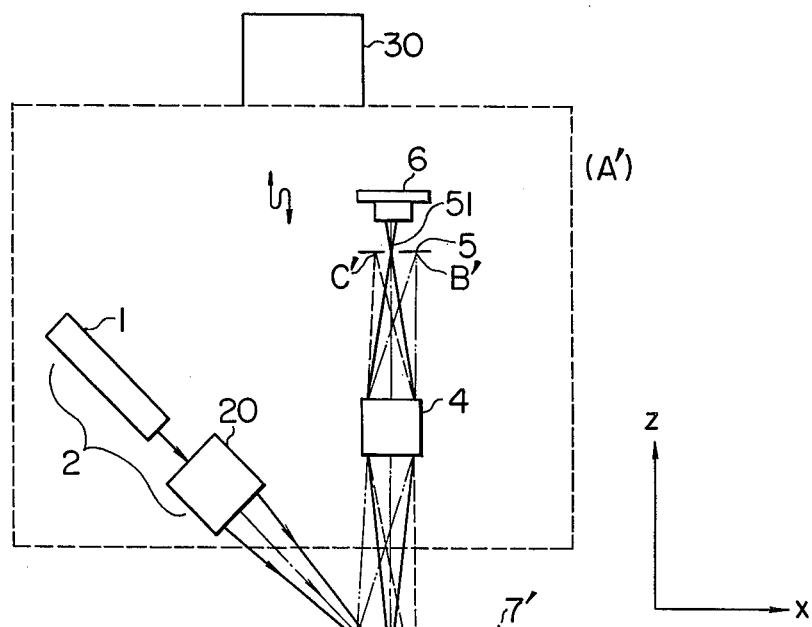
FIG. 1 shows one embodiment of the present invention.
Figure 2:
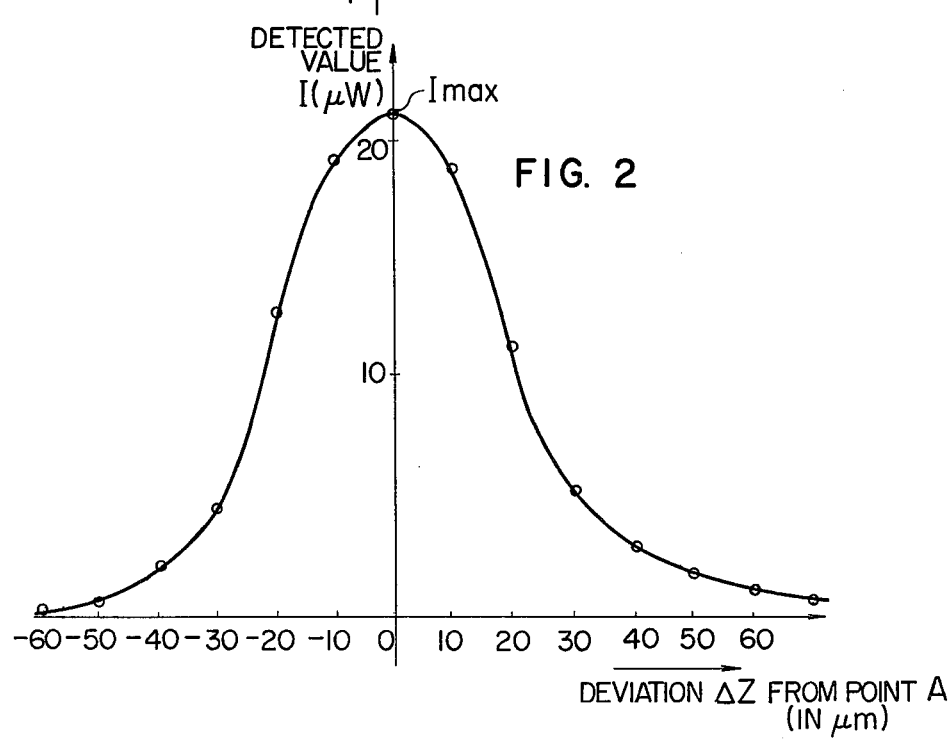
FIG. 2 shows a chart of an experimental data illustrating a change in a light intensity transmitted through a detecting light screen with a deviation of a surface of an object from a point A in a detection system of the present invention.

The preferred embodiments of present invention will now be described in detail. FIG. 1 shows one embodiment of the present invention. Numeral 2 denotes a light beam condensing and irradiating system comprising a laser light source 1 and a laser spot projection lens 20. The light beam is converged such that it has a minimum spot diameter $D_0$ at a point A on an optical axis angled by $\theta$ relative to a reference direction. The converging diameter at the point A is appropriately determined depending on an accuracy required in the measurement of an object. For example, when a three-dimensional shape is to be measured with the accuracy of 20 μm, the laser spot projection lens 20 is selected such that the spot diameter at the minimum converging diameter point A is approximately 20 μm. When the object 7 is located at a position shown by a solid line in FIG. 1 and the point A is on the object, the laser beam reflected by the object is received by an imaging optical system 4 having an optical axis which is angled by $\phi$ relative to the reference direction so that an image A' of the point A is focused at an aperture 51 on a detecting light screen 5. The aperture 51 is circular or has an elongated slit which extends perpendicularly to the plane of the drawing and has a width (or a diameter for the circle) is approximately equal to a product of the converging diameter at the point A multiplied by a magnification factor M of the imaging optical system, that is, a focusing spot diameter $D_1$ of the point A. The light transmitted through the aperture is received by an aperture-transmitted light detector 6 which determines an intensity of the transmitted light. When the object is located at a position shown by a broken line 7' or 7", the irradiating beam irradiates a point B or a point C of the object. The light reflected at the point B or C is received by the imaging optical system 4 which images at a point B' or C' on the detecting light screen 5. Since the points B' or C' is not a correct focusing point, the focusing spot diameter is larger than $D_1$. Because of the spread of the spot beam, the intensity of the light entering the aperture 51 of the detecting light screen 5 is several orders smaller than that of the light entering when the surface of the object 7 is at the point A. This phenomenon appears markedly with a slight deviation of the surface of the object from the point A, resulting in sudden decrease of the light intensity. FIG. 2 shows a chart of an experimental data. The irradiated beam spot A having the diameter of 20 μm is focused by the imaging optical system having the magnification factor of 1 at the aperture of the detecting light screen having the slit width of 30 μm. FIG. 2 shows a change in the detected light intensity I of the light transmitted through the aperture with a deviation $\Delta Z$ of the surface of the object from the point A. When $\Delta Z=0$, the image of the point A is focused on the aperture so that the intensity is maximum $I_{max}$. When $\Delta Z$ is 20 μm, the intensity decrease to approximately one half of the maximum intensity $I_{max}$. When $\Delta Z$ is 40 μm, the intensity is 1/10 of $I_{max}$, and when $\Delta Z$ is 60-70 μm the intensity suddenly decreases to 1/100 of $I_{max}$.

In accordance with the present invention, by detecting a sharp peak of the intensity of the detection signal of the aperture-transmitted light, a high accuracy measurement is attained. In detecting the maximum value, an A/D converter is used as will be explained later so that the maximum level is determined from the digital-converted value. As a result, even when the signal level changes from object to object or from measuring point to measuring point of the object by the affect of the optical reflection characteristic of the surface of the object, the maximum value can be precisely detected and hence high accurate measurement is attained. In measuring the three-dimensional shape by the method described above, the entire optical system is moved in a fixed direction, e.g. in a Z-direction (which is substantially orthogonal to the uneven surface of the object) by detecting position changing means 30 shown in FIG. 1, which may comprise a motor and a lead screw, and the maximum value of the output of the aperture-transmitted light detection is detected by the above method and the amount of displacement by the detecting position changing means at the instant of the maximum output is detected by a magnescale or an optical scale mounted on the changing means. The object is then moved in a direction, for example, in X-direction, which is orthogonal to the Z-direction to measure a different point by the same method. The measurement is repeatedly carried out for a number of points to measure the overall three-dimensional shape or the shape in a desired cross-section by the non-contact method.

Figure 3:
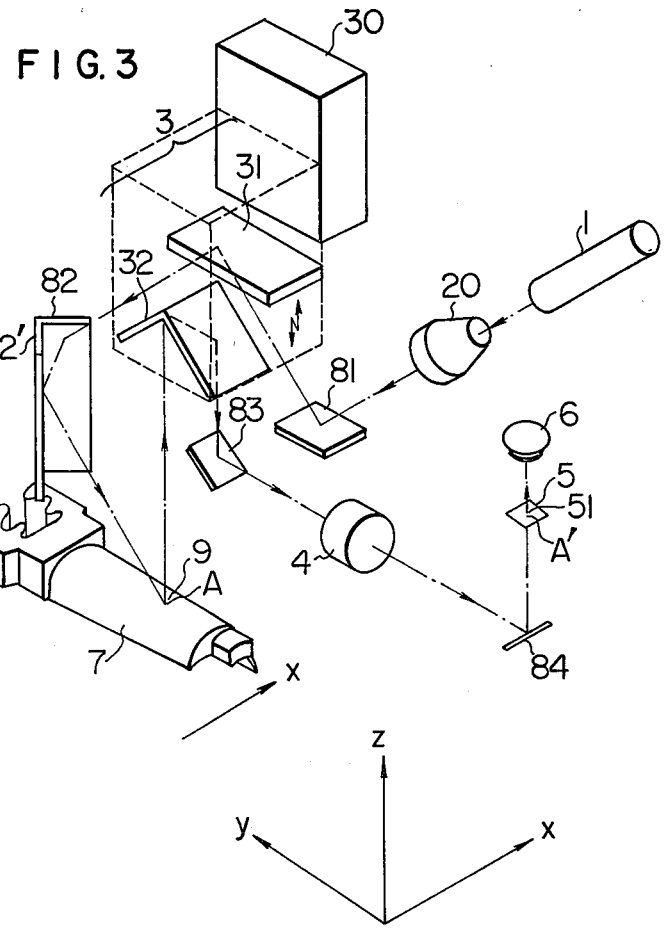
FIG. 3 shows one embodiment of the present invention in which the position of the point A is changed by a reflecting mirror.

FIG. 3 shows one embodiment of the present invention, in which like numerals to those shown in FIG. 1 denote like elements. The light emitted from the laser light source 1 passes through the laser spot projection lens 20, reflected by reflecting mirrors 81, 31, 82 and 82' and irradiated to the object 7. Since the projecting spot position adjusting reflection mirror 31 is fixed to the detecting position changing means 30 which comprises a movable table, the point A which defines the minimum converging diameter moves as the table moves. When the normal line to the plane of the reflecting mirror 31 is parallel to the direction of movement of the table and the normal lines to the planes of the reflecting mirrors 82 and 82' are orthogonal thereto, the direction of the movement of the point A when the table is moved coincides with the direction of movement of the table. Numeral 32 denotes a right angle reflecting mirror for adjusting the imaging spot position, which comprises a pair of plane mirrors arranged orthogonally to each other or a rectangular prism. It is fixed to the movable table. When a plane including the normal lines to the pair of reflecting planes in parallel to the direction of movement of the table, the point A is always focused at the spatially fixed point A', independently of the position of the table, by the imaging lens 4 through the reflecting mirrors 32 and 83. Accordingly, by arranging the pinhole or slit 5 at that position and receiving the light transmitted through the pinhole by the light detector 6 to detect the maximum level in the manner described above, the time instant at which the point A reaches the surface of the object 7 can be precisely detected so that high accuracy measurement is attained. In the present embodiment, for the distance $l_z$ of the movement of the table of the detecting position changing means, the point A moves by the distance $2 l_z$. Accordingly, the moveable range is one half of that in the embodiment of FIG. 1 and it is enough to make only the reflecting mirrors 31 and 32 movable. Hence, the weight of the moving parts can be reduced.

Figure 5:
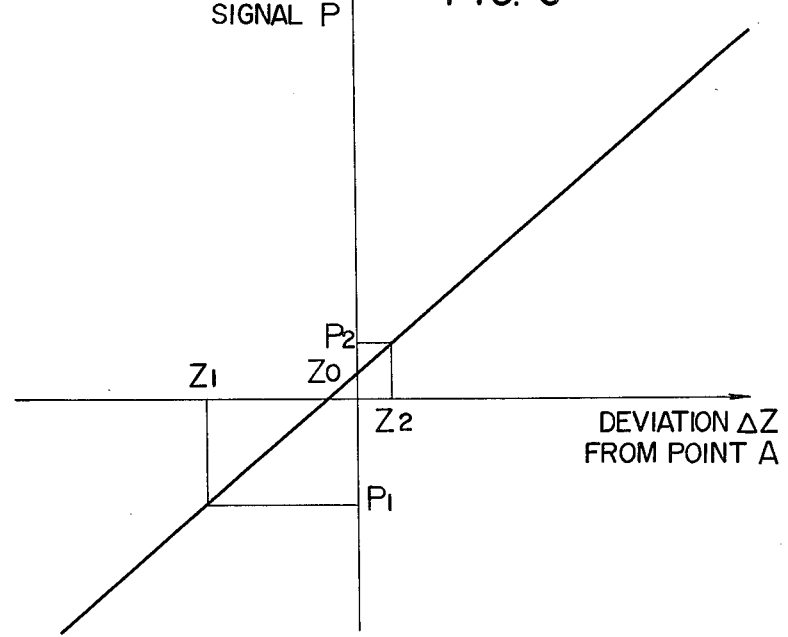
FIG. 5 shows a chart illustrating a change in an output signal of the light position detector of FIG. 4 with a deviation of the surface of the object from the point A.
Figure 4:
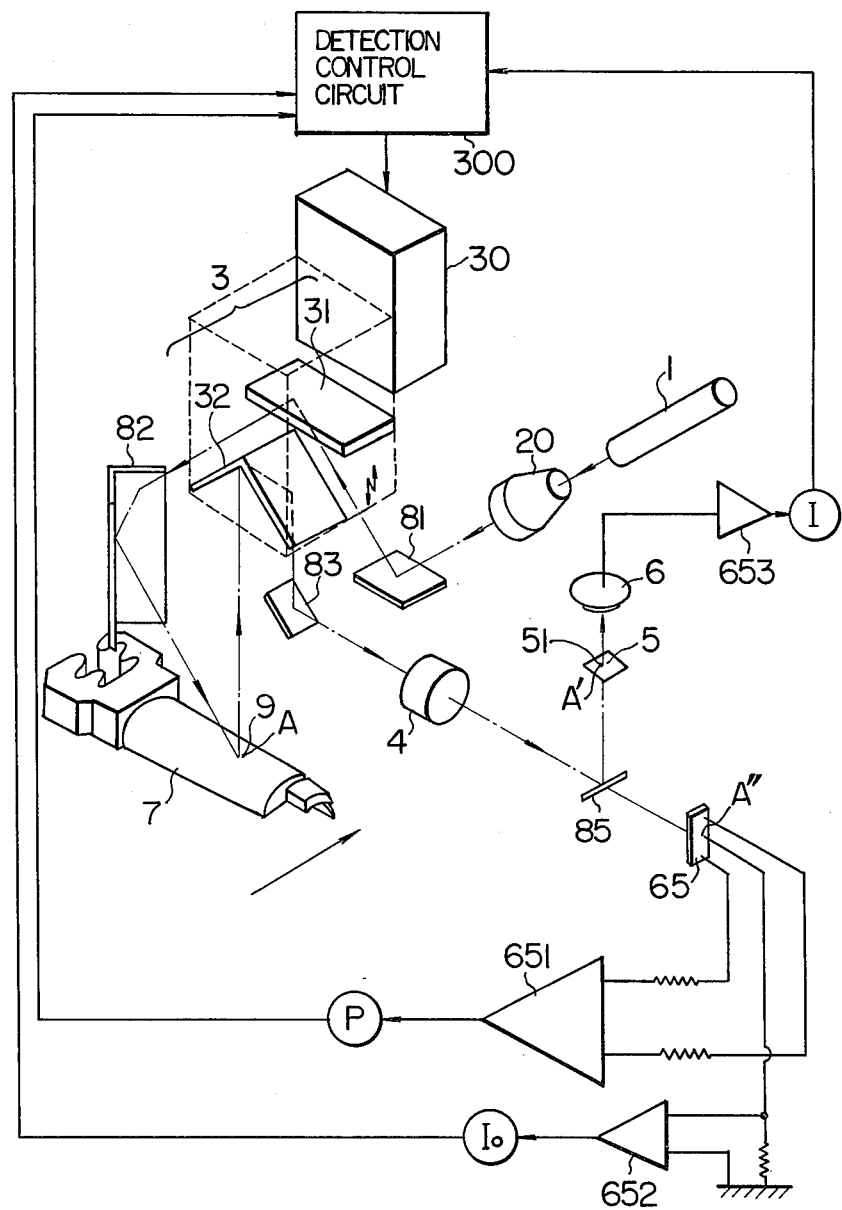
FIG. 4 shows one embodiment of the present invention which employs a light position detector.

FIG. 4 shows one embodiment of the present invention in which like numerals to those shown in FIG. 3 denote like elements. A semi-transparent mirror 85 is used in place of the reflecting mirror 84 in the imaging optical system of FIG. 3. The light reflected by the semi-transparent mirror 85 passes through the pinhole so that the maximum value is detected from the pinhole-transmitted light in the same manner as in FIG. 3, and the light transmitted through the semi-transparent mirror 85 is received by the light position detector 65, which produces an electrical signal level which substantially represents the light receiving position as is known in the art. Accordingly, it is positioned such that the point A is focused at a center of the light position detector 65. As a result, as shown in FIG. 5, when an image A'' of the point A is above the surface of the object, a differential amplifier 651 produces, for example, a positive signal output P, and when the image point A'' is below the surface of the object it produces a negative signal output. This signal is fed to a detection control circuit 300 which controls the detecting position changing means 30 such that the point A comes closer to the surface of the object. However, since the detection signal of the light position detector 65 is affected by a variance in the intensity of the received light, a drift of the amplifier circuit and a noise, $\Delta Z$ is not always zero when the signal level is zero but it is $Z_0$ as shown in FIG. 5. Accordingly, if, for example, the signal is $P_1$ (negative) when the current deviation of the surface of the object from the point A is $Z_1$, the detecting position changing means is driven in the direction to change the signal P to zero, past a point at which the signal P is zero until a predetermined distance $(Z_2-Z_0)$ has been moved, where it is stopped. Thus, during the course of the movement from $Z_1$ to $Z_2$, the signal I derived from the light detector 6 and the amplifier 653 passes the maximum point. In this manner the maximum point can be detected in a short time and the measurement time is shortened.

Figure 6:
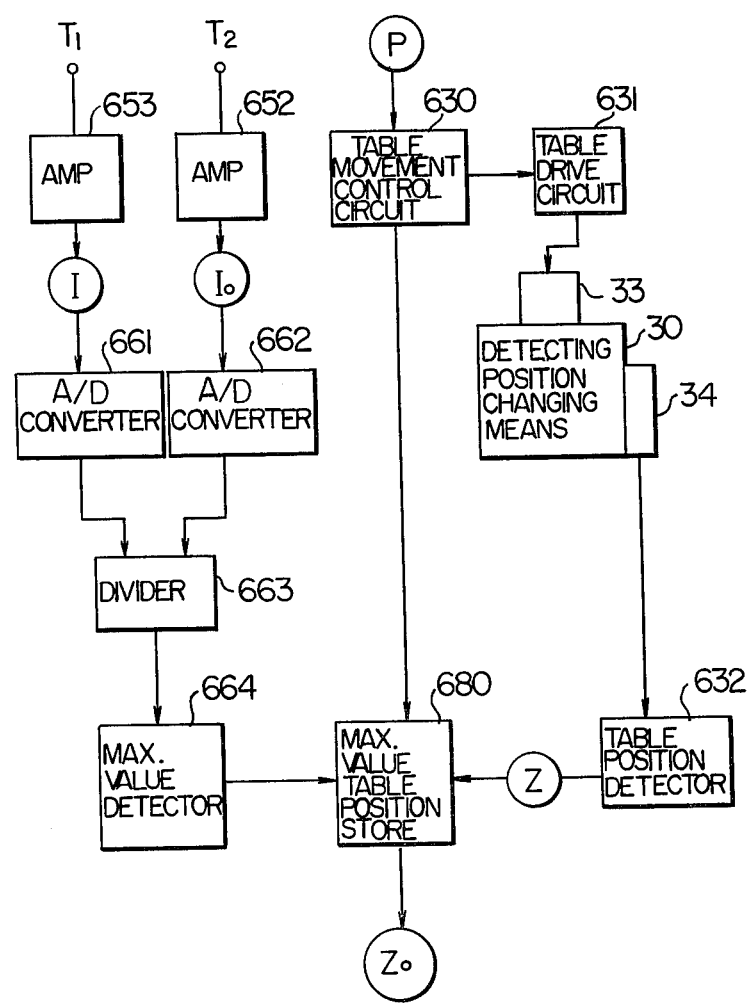
FIG. 6 shows one embodiment of the present invention illustrating a configuration of a detection control circuit.

FIG. 6 shows one embodiment of the present invention which shows a detailed diagram of the detection control circuit 300 of FIG. 4. Like numerals to those in FIG. 4 denote like elements. The light position detector 65 can also measure the intensity of the received light. The intensity signal is amplified by an amplifier 652 to produce a signal $I_o$ which is proportional to the light intensity received by the imaging lens. By dividing the amplified signal I of the pinhole-transmitted light by the signal $I_o$ and detecting a maximum value of $I/I_o$, more accurate measurement is attained.

The reason for the above is explained below. The object 7 usually has a machined surface and surface finish widely changes from object to object. When a laser spot having a diameter of several tens $\mu$m is irradiated to an object having a fine surface finish, a so-called speckle pattern having a relatively long change period is produced. If the change period is larger than an aperture diameter of the lens, the amount of laser beam received by the aperture of the lens materially changes by a slight deviation (in the order of the spot diameter) of the irradiation point on the object. As a result, the amount of light transmitted through the aperture of the detecting light screen also changes. By detecting the maximum value of $I/I_o$, the above affect is eliminated. Numerals 661 and 662 in FIG. 6 denote A/D converters for converting the analog signals I and $I_o$ to digital signals. By converting the signals to digital form, the comparison and the store of the signals can be precisely and readily effected, and when the division operation is carried out as shown in FIG. 6, it can be effected more precisely than the analog operation. Numeral 663 denotes a divider circuit for the digital signals a resulting quotient is supplied to a maximum value detection circuit 664 which determines the maximum value when the point A is changed by the detecting position changing means. Numeral 630 denotes a table movement control circuit which controls a table drive circuit 631 to drive the table toward the zero light position detection signal position and further drive the table by the predetermined distance after the zero detection. When the table movement is stopped, the control circuit 630 sends a signal indicating the completion of the measurement of that point to a maximum value table position store circuit 680, which receives the signal from the maximum value detection circuit 664 when the maximum value is detected and reads in and stores the data of the table position detecting circuit 632. Thus, the stored table position signal $Z_0$ is provided as a measured value. Numeral 34 denotes the table position detector which may be the magnescale described above. The normal direction $\alpha$ to the plane of the measuring point of the object changes with the measuring point. When the $\alpha$ is on a bisecting direction of $\theta$ and $\phi$, the reflected light coincides with the optical axis of the imaging optical system so that the intensity of the received light is very large. As the direction $\alpha$ deviates from the bisecting direction, the intensity decreases. The light intensity varies over two or more orders. In order to measure such a wide range of intensity, a small noise light receiver is used and the wide range of variation is amplified by the amplifiers 651 and 652 and the amplified signal is converted to the digital signal by the A/D converter of 14-bit capacity to detect the maximum value.

Figure 7:
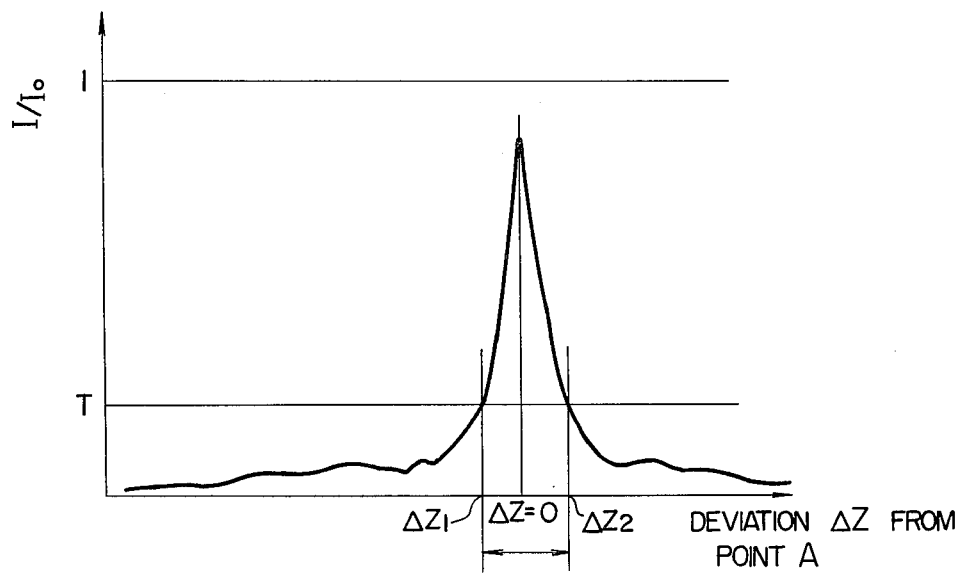
FIG. 7 shows a chart illustrating a change in a relative value of a light transmitted through an aperture to a light transmitted through an imaging lens with a deviation of the surface of the object from the point A.

In the maximum value detection means shown in FIG. 6, in addition to the maximum value detection method described above, the following condition may be added to attain further accurate maximum value detection. FIG. 7 shows a relation between the deviation $\Delta Z$ of the object from the point A and $I/I_o$ over a relatively wide range. Since a number of peaks exist at points other than the point of $\Delta Z=0$, if the point of $\Delta Z=0$ does not exist in a given range of $\Delta Z$ when $\Delta Z$ is changed to determine the maximum value point, a peak point within that range would be determined as a point at which the surface of the object coincide with the point A. When the point A is on the surface of the object, however, more than one half of the light transmitted through the imaging lens strikes the aperture of detecting light screen. Accordingly, it is possible to determine that the point A is on the surface of the object only when $I/I_o$ exceeds a predetermined threshold. By using this condition, the misjudge of the peak (pseudo maximum value) as the maximum value is prevented and reliable measurement of the three-dimensional shape is accomplished.

Figure 8:
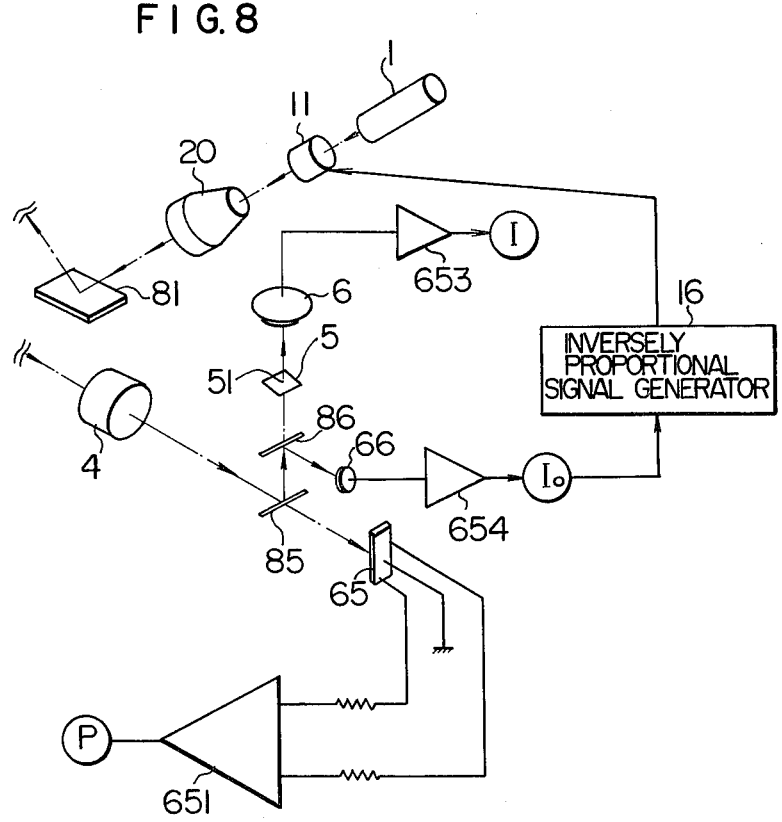
FIG. 8 shows another embodiment of the present invention.

FIG. 8 shows one embodiment of the present invention in which like numerals to those shown in FIG. 4 denote like elements. FIG. 8 shows only a portion of the entire optical system shown in FIG. 4 and the remaining portion is omitted. The present embodiment differs from the embodiment of FIG. 4 in that a portion of light reflected by the semi-transparent mirror 85 is partially reflected by a semi-transparent mirror 86 and the reflected light is received by a light detector 66. An amplified signal $I_o$ from an amplifier 654 is supplied to an inversely proportional signal generation circuit 16 which produces a signal inversely proportional to $I_o$. This signal is fed to the irradiation light intensity changing means 11 to feedback control it. Thus the total light intensity received by the imaging lens is always kept constant so that the maximum value of the light transmitted through the detecting light screen 5 can be used as a true maximum value to further increase the accuracy of measurement.

In the embodiments shown in FIGS. 1, 3 and 4, when the three-dimensional shape of the object having a ground surface or sand sheet-machined surface is to be measured by, for example, a He-Ne laser of approximately 5 mW, the bisected direction of $\theta$ and $\phi$ and the direction $\alpha$ makes an angle of 30 degrees or more. Thus if an effective aperture ratio of the imaging optical system is 5-10, the maximum value of I reaches several tens nW. Accordingly, if the present device is used in a room of normal brightness, the light in the room impinges against the object and the light reflected by the object impinges against the imaging optical system to adversely affect the measurement. Thus, when the laser is used, filters which selectively transmit only the laser wavelength are arranged in front of the aperture-transmitted light detector 6, the light position detector 65 and the detector (65 in FIG. 4) used in the total light amount detecting means. In this manner, the noise light can be substantially fully blocked and the highly accurate measurement is accomplished.

In the embodiment of FIGS. 1, 3 and 4, the detecting light screen having a predetermined aperture is used and the light transmitted therethrough is received by the light detector. In order to accomplish the object of the present invention, a detector having a small effective photo-sensitive area which conforms to the dimensions of the aperture described above may be arranged at the focusing position of the point A. In this case, however, stray light is the optical system of the device is also received and hence a noise component inevitably increases. The aperture of the detecting light screen in FIGS. 1, 3 and 4 may be circular, ellipsoidal or of slit shape. When the ellipsoidal or slit shape is used, it is arranged such that the direction of shorter width of the aperture is aligned with the direction of change in position (points B' and C' in FIG. 1) on the detecting light screen of the light reflected from the object, which change is caused by the deviation of the object from the point A. When the width (aperture width) is no less than 0.5 times and no more than two times as large as the product of the converging diameter at the point A by the focusing magnification factor M of the imaging optical system, the maximum value can be detected precisely. The reason therefor will be explained below. If the bisected direction of $\theta$ and $\phi$ coincides with the normal direction $\alpha$ to the plane of the measuring point of the object, the image on the light detecting screen corresponds to M times of the irradiated spot of diameter $D_1$ which its center at A. Therefore, the optimum value of the aperture width is equal to $MD_1$. On the other hand, if the bisected direction of $\theta$ and $\phi$ is at a substantial angle with the direction $\alpha$, the optimum value of the aperture width changes depending on the value of the angle.

If the angle made by the bisecting line of $\theta$ and $\phi$ and the direction $\alpha$ changes within +30 degrees, an optimum aperture width is found between 0.6 times and 1.6 times. When it changes within +45 degrees, the optimum aperture width is found between 0.4 times and 2.4 times. When the laser beam having a uniform intensity distribution within the diameter $D_1$ of the irradiated spot A is used, the focused spot has a highly ununiform intensity distribution in the area of the spot due to the surface unevenness of the object in the spot area. If the slit width is too short relative to the focused spot diameter, the affect by the non-uniform distribution is large and the accurate detection cannot be attained, and if the slit width is too large relative to the focused spot diameter, the sharp change of the maximum value for a slight deviation of the surface of the object from the point A is not obtained and the accurate detection cannot be attained. Accordingly, it is desirable to select the slit width within the range described above.

As described in detail with reference to the above embodiments, the present invention allows the stable measurement of the three-dimensional shape, which uses the non-contact method, can measure a wide range of length with a high accuracy and is less affected by the reflection characteristic of the object than the prior art optical methods. Particularly, the present device can measure an object of more than 200 mm length with the accuracy of 0.02 mm. The measuring time is roughly one order shorter than that of the contact method.

Figure 9:
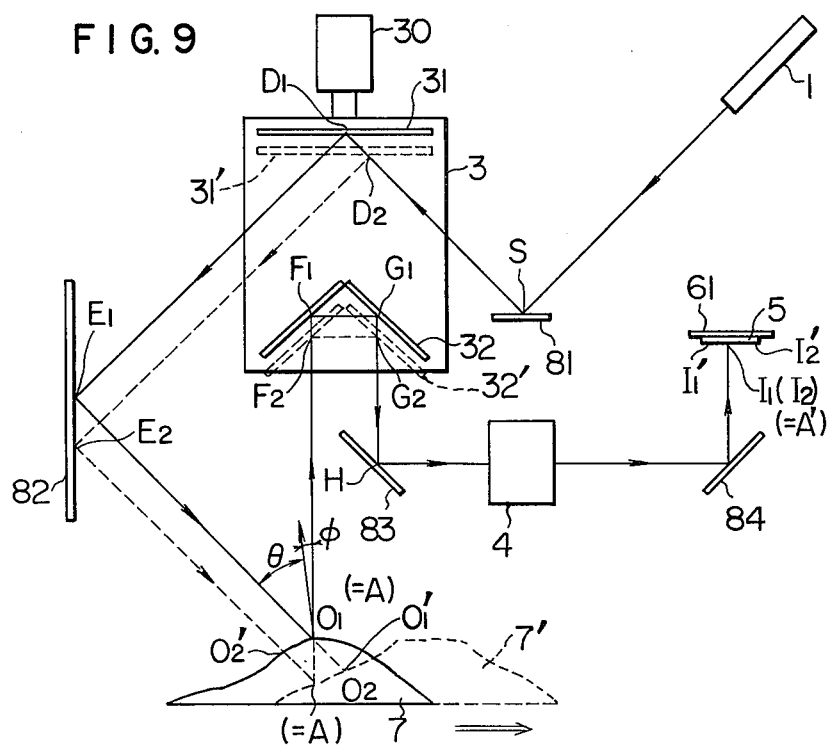
FIGS. 9, 10, 11 and 12 show other embodiments of the present invention.

The construction of the reflecting mirrors 31 and 32 shown in FIGS. 3 and 4, which is effective to make small the moving parts thereby to allow fast measurement, is now explained in detail with reference to FIGS. 9 to 12. Referring to FIG. 9, numeral 1 denotes the laser light source. The laser beam emanated therefrom is reflected by the reflecting mirror 81, the movable mirror 31 and the reflecting mirror 82 and projected to the object 7. A portion of the light reflected from the projecting point $0_1$ on the surface of the object 7 is reflected by the orthogonal movable mirror 32 and the reflecting mirror 83, and the point $0_1$ is focused to the center $I_1$ or the point $A_1$ on the position detecting plane 5 of the light position detector 61 by the imaging lens 4. The optical axis of the imaging lens and the projecting laser beam intersects at the point A. When the object is on the broken line 7', the projecting point on the surface of the object is $0_1'$ and the light reflected therefrom is focused at a point $I_1'$ on the position detecting plane 5. When the object is on the line 7', the table 3 on which the movable mirrors 31 and 32 are mounted is moved by the table drive motor 30. When the movable mirrors are positioned at 31' and 32' shown by broken lines, the projected spot on the object is at a point $0_2$, which is the optical axis of the imaging lens 4. Thus, the point $0_2$ is the point A this time and it is focused at a center $I_2$ (which is the same point as the center $I_1$ or the point A') on the position detecting plane 5. The reason therefor will be explained later. In this manner, by detecting the instant when the projected beam spot is focused at the point A' on the position detecting plane as the movable mirrors are moved, the information on the level of the object can be obtained from the position of the movable mirrors at that instant. To this end, the object and the optical system are relatively moved to obtain the level information in the manner described above so that the three-dimensional shape can be measured. The reason therefor is explained below. As shown in FIG. 9, a distance $L_1$ between the reflecting point S of the reflecting mirror 81 and the projecting point $0_1$ or $0_2$ on the surface of the object and a distance $L_2$ from the projecting point $0_1$ or $0_2$ and the reflecting point H of the reflecting mirror 83 are always constant independently of the positions of the movable mirrors 31 and 32 which are moved integrally. That is, $$SD_1 = D_1E_1 = E_10_1 = SD_2 = D_2E_2 = E_20_2 \equiv L_1 \qquad (1)$$

$$0_1F_1 + F_1G_1 + G_1H = 0_2F_2 + F_2G_2 + G_2H \equiv L_2 \qquad (2)$$

because the reflecting plane of the reflecting mirror 82, the optical axis $0_1F_1$ (or $0_2F_2$) of the imaging system and the direction of movement of the movable mirrors are parallel to each other and the movable mirror 32 is the orthogonal mirror. By representing a difference between the solid line position of the movable mirror 31 and the broken line position by $\Delta l$ ( and an angle of incidence to the movable mirror 31 by $\theta$, we get $$SD_2 = SD_1 - \Delta l/\cos\theta \quad (3)$$

$$D_2E_2 = D_1E_1 + \Delta l/\cos\theta \quad (4)$$

$$E_2O_2 = E_1O_1 \quad (5)$$

Accordingly, the equation (1) is valid. And $$O_2F_2 = O_1F_1 + 2\Delta l - \Delta l \quad (6)$$

$$F_2G_2 = F_1G_1 \quad (7)$$

$$G_2F = G_1F - \Delta l \quad (8)$$

Accordingly, the equation (2) is valid. Consequently, when the laser beam is projected to the surface of the object on the optical axis of the imaging optical system (that is, when the point A is on the surface of the object), the projecting point is focused at the fixed point A' (center) on the position detecting plane 5 because the distance between the projecting point and the imaging lens is constant independently of the level of the surface of the object. As is apparent from the above description, for the level change of $2\Delta l$ of the object, the movable mirrors 31 and 32 need be moved by $\Delta l$ that is, one half of the level change to attain the detection of the three-dimensional shape. Thus, the drive range need only be one half of the change in the three-dimensional shape of the object and the point $O_1$ can be moved at a double speed of the speed of the movable mirror and hence high speed measurement is accomplished. Further, since the movable mirrors are only movable parts, the size and the weight of the movable parts can be reduced.

Figure 10:
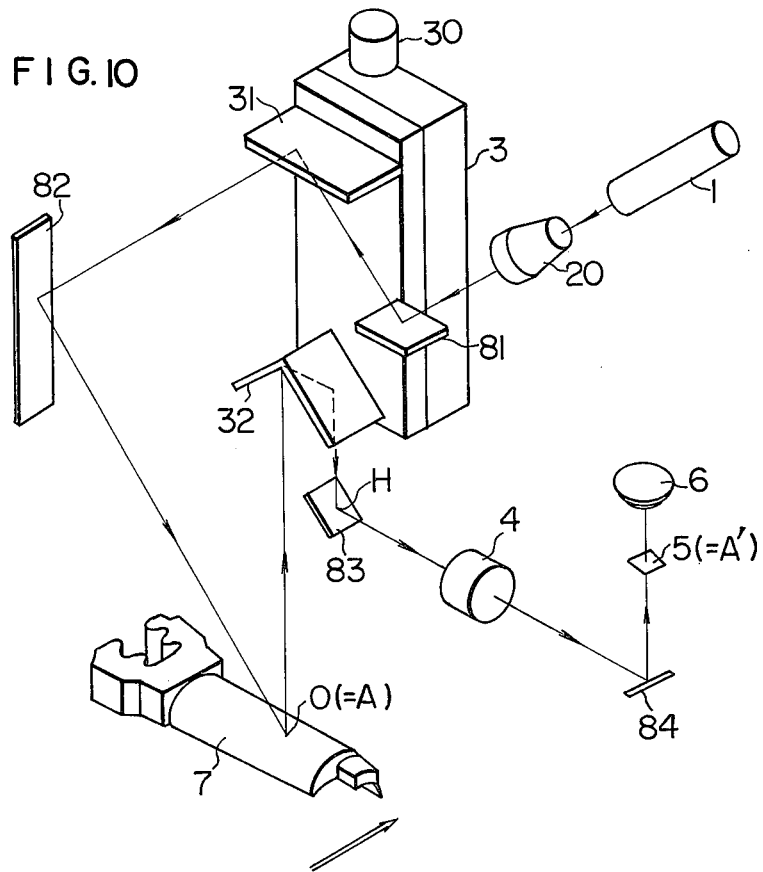

FIG. 10 shows another embodiment of the present invention in which like numerals to those shown in FIGS. 3, 4 and 9 denote like elements. The laser beam emanated from the laser light source 1 is converged by the laser spot projecting lens 20 such that the converging diameter is minimum at the point A. If the point A is on the surface of the object 7, the point A is on the optical axis of the imaging optical system and it is focused at the center of the position detecting plane 5. As described above, since the distance between the point S and the point A is constant independently of the position of the movable mirrors and the distance between the point A and the point H is also constant independently of the position of the movable mirrors, the minimum diameter image is also focused at the center of the position detecting plane 5 if the minimum converging diameter point A is on the surface of the object. The aperture having a diameter approximately equal to the minimum diameter of the focused spot (or the slit having a width approximately equal thereto) is formed at the center of the position detecting plane 5 and the light transmitted therethrough is received by the light detector 6. The maximum value point of the detection signal represents the instant at which the point A coincides with the surface of the object, and the amount of movement of the table at that instant is determined. In this manner, the measurement is attained with the accuracy of the minimum converging diameter of the irradiated beam and the wide range and accurate measurement of the three-dimensional shape can be accomplished.

Figure 11:
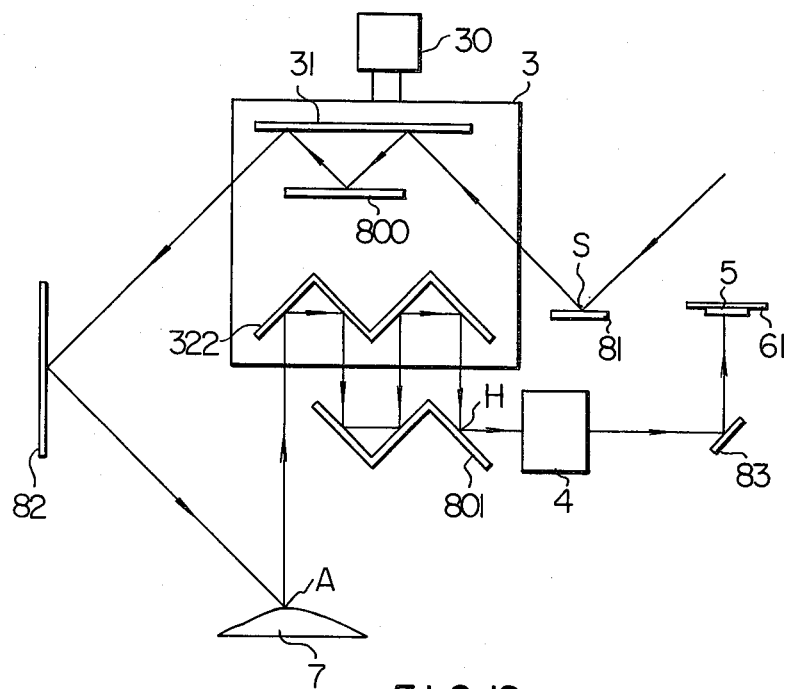

FIG. 11 shows another embodiment of the present invention in which like numerals to those shown in FIGS. 9 and 10 denote like elements. In the present embodiment, the projecting light reflected by the movable mirror 31 is reflected by reflecting mirror 800 and again reflected by the movable mirror 31, thence it is projected to the object. The light reflected from the object 7 is reflected by an orthogonal movable mirror 322, reflected by a reflecting mirror 801 and again reflected by the movable mirror 322, thence it is projected to the imaging lens 4. The distance from the point S to the point A and the distance from the point A to the point H are constant independently of the positions of the movable mirror 31 and 322 which are moved together. This can be proved in the exactly same way as that used to prove that the optical path length in FIG. 9 is constant independently of the positions of the movable mirrors. The embodiment of FIG. 11 differs from the embodiment of FIG. 9 in that the distance of movement of the point A is 4 $\Delta l'$ for the distance of movement $\Delta l'$ of the movable mirrors. Thus, in the embodiment of FIG. 11, the range of the movement of the table need be a quarter of the change in the three-dimensional shape of the object and hence the measurement speed is increased by a factor of four as compared with the prior art device.

Figure 12:
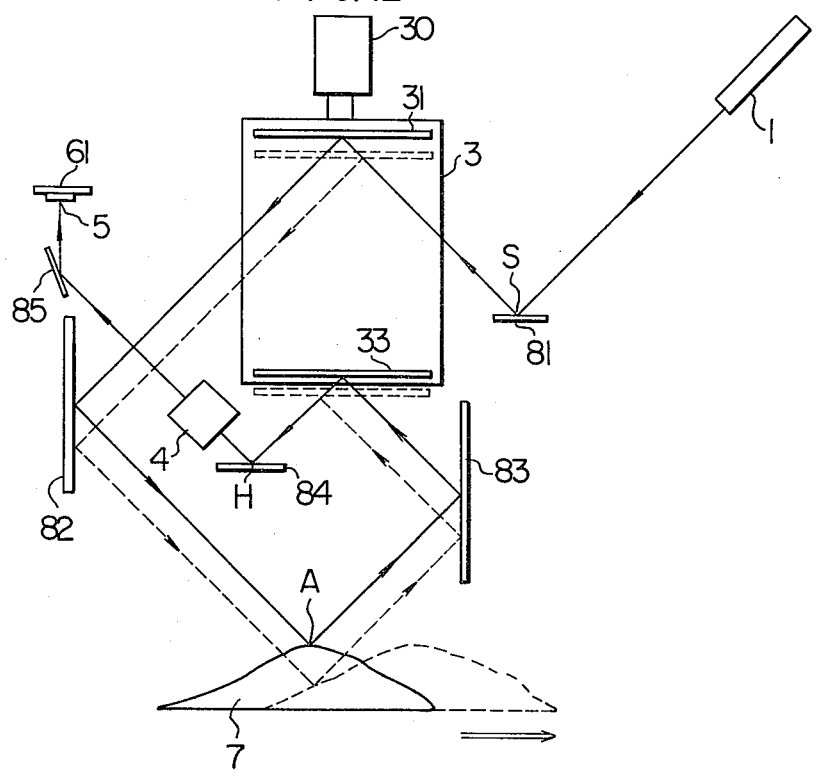

FIG. 12 shows another embodiment of the present invention in which like numerals to those shown in FIGS. 3, 4 and 9 to 11 denote like elements. In the embodiment of FIG. 12, the movable mirror in the imaging optical system is a plane mirror. When the object surface is close to a plane, a directly reflected light therefrom is imaged by the imaging system. Again, in the arrangement of FIG. 12, the distance between the point A and the point H is constant independently of the position of the movable mirror 33 so that the point A is always focused at the center of the position detecting plane.

As described hereinabove, according to the present invention, the three-dimensional shape can be measured by the optical non-contact method by driving the small and light movable parts within a small drive range, and the measuring time can be reduced to less than one half of that of the prior art device.

We claim:

1. A three-dimensional shape measuring device comprising:

(a) a light beam condensing and irradiating system for irradiating a light beam on an object at a predetermined angle with respect to an X-Y plane and converging said light beam to a desired minimum converging diameter at a point on an optical axis of said light beam;

(b) an imaging optical system having an optical axis having an angle different from said predetermined angle with respect to said X-Y plane and including said point on said optical axis thereof, for focusing said point on an effectively constant aperture of a detecting light screen, a width of said aperture being approximately equal to a product of the converging diameter at the point multiplied by a magnification factor M of the image optical system;

(c) photo detecting means arranged to receive an optical image transmitted through said aperture of said imaging optical system;

(d) detecting position moving means for moving said object and said point relatively with respect to each other along X, Y and Z axes, said detecting position moving means including movable mirrors mounted on a linearly movable table in the Z axis direction and disposed in said light beam condensing and irradiating system and said imaging optical system whereby an optical length of said imaging optical system for focusing said point on said aperture is always constant;

(e) maximum value detecting means for detecting a maximum value in a signal detected by said photo detecting means;

(f) detecting means for detecting a displacement in the detecting position along the X, Y and Z axes caused by said detecting position moving means at a time when said maximum value detecting means detects the maximum value; and (g) the displacement in the detecting position being sequentially detected by said detecting means for each of a plurality of points on the surface of said object whereby the three-dimemsional shape is measured.

2. A three-dimensional shape measuring device according to claim 1, wherein a surface of one of the mirrors disposed in said light beam condensing and irradiating system is arranged in parallel to said X-Y plane and a surface of another mirror disposed in said imaging optical system is arranged in parallel to said X-Y plane.

3. A three-dimensional shape measuring device according to claim 1, wherein a surface of a mirror disposed in said light beam condensing and irradiating system is arranged in parallel to said X-Y plane and at least a pair of mirrors disposed in said imaging optical system is arranged symmetrically in a direction of said X-Y plane.

4. A three-dimensional shape measuring device according to claim 3, wherein said light beam condensing and irradiating system has a mirror disposed between said movable mirror and the point of the object, a surface of said mirror being arranged in the Z axis direction.

5. A three-dimensional shape measuring device according to claim 1 further including an optical path divider disposed between said imaging optical system and said photo detecting means and linearly movable table being driven by the signal from said photo detecting means.

6. A three-dimensional shape measuring device according to claim 1 further comprising total light amount detecting means for detecting a total amount of the imaging light transmitted through said imaging optical system, said maximum value detecting means dividing the detection signal of said photo detecting means by the total light amount detected by said total light amount detecting means, a maximum value of the resulting quotient being used as a true maximum value.

7. A three-dimensional shape measuring device according to claim 1 further comprising light amount varying means for effectively varying the light amount of a light source of said light beam condensing and irradiating system and total light amount detecting means for detecting the total light amount of the imaging light transmitted through said imaging optical system, whereby the light amount of said light source is effectively varied in a manner inversely porportional to the total light amount detected by said total light amount detecting means so that the total light amount is controlled to be substantially constant.

8. A three-dimensional shape measuring device according to claim 1 wherein said light beam condensing and irradiating system includes a light source having a narrow pulse width and further comprising a filter for selectively transmitting the same spectrum light as the light of said light source disposed in front of said aperture-transmitted light detecting means.

9. A three-dimensional shape measuring device according to claim 5 wherein said light beam condensing and irradiating system includes a light source having a narrow pulse width and further comprising a filter for selectively transmitting the same spectrum light as the light of said light source disposed in front of said light position detecting means.

10. A three-dimensional shape measuring device according to claim 6 or 7 wherein said light beam condensing and irradiating system includes a light source having a narrow pulse width and further comprising a filter for selectively transmitting the same spectrum light as the light of said light source disposed in front of said total light amount detecting means.

11. A three-dimensional shape measuring device according to claim 1 wherein a width of said aperture of said detecting light screen is selected between 0.5 times and 2 times of a product of the minimum coverging diameter at said point multiplied by a focusing magnification factor of said imaging optical system.

12. A three-dimensional shape measuring device according to claim 1 wherein said maximum value detecting means includes circuit means for converting the signal from said photo detecting means to a digital signal to detect said maximum value by a change in said digital signal which represents the charge in the relative position between said object and said point.

13. A three-dimensional shape measuring device according to claim 6 wherein said light amount detected by said total light amount detecting means is converted to a digital signal, said signal detected by said photo detecting means is converted to a digital signal, said latter digital signal is digitally divided by said former digital signal and a resulting guotient is used to detect the maximum value.

14. A three-dimensional shape measuring device according to claim 6 wherein said maximum value detecting means detects a true maximum value when a quotient of the signal detected by said photo detecting means divided by the total light amount detected by said total light amount detecting means exceeds a predetermined threshold and said quotient is at maximum.

15. A three-dimensional shape measuring device according to claim 1, further including an optical path divider disposed between said imaging optical system and said photo-electric converter means, said photo-electric converter means being disposed in one of the optical paths divided by said optical path divider, said light position detecting means being disposed in the other optical path at the focusing plane of the point by said imaging optical system, said linearly movable table being driven by the signal from said light position detecting means whereby the distance between the surface of said object and said point is reduced.

16. A three-dimensional shape measuring device according to claim 1 further comprising total light amount detecting means for detecting a total amount of the imaging light transmitted through said imaging optical system and divided by a second optical path divider, and dividing means for dividing the signal obtained from said photodetecting means by the total amount of signal obtained from said total light amount detecting means, whereby the divided signal obtained from said dividing means is used as the signal for detecting the maximum value by maximum value detecting means.

17. A three-dimensional shape measuring device according to claim 1 further comprising light amount varying means for effectively varying the light amount of a light source of said light beam condensing and irradiating system and total light amount detecting means for detecting the total light amount of the imaging light transmitted through said image optical system and divided by a second optical path divider, whereby the light amount of said light source is effectively varied in a manner inversely proportional to the total light amount detected by said total light amount detecting means so that the total light amount is controlled to be substantially constant.

* * * * *

UNITED STATES PATENT AND TRADEMARK OFFICE
CERTIFICATE OF CORRECTION

PATENT NO. : 4,473,750
DATED : September 25, 1984
INVENTOR(S) : Yoshitada OSHIDA et al.

It is certified that error appears in the above—identified patent and that said Letters Patent are hereby corrected as shown below:

On the cover page of the above patent, first column, please delete Appl. No. "238,512" and insert therefor Appl. No. --286,512--.

Signed and Sealed this

Ninth Day of April 1985

[SEAL]

Attest:

DONALD J. QUIGG

Attesting Officer  Acting Commissioner of Patents and Trademarks